United States Patent [19]

Halloran

[11] Patent Number: 5,463,355
[45] Date of Patent: Oct. 31, 1995

[54] WIDEBAND VECTOR MODULATOR WHICH COMBINES OUTPUTS OF A PLURALITY OF QPSK MODULATORS

[75] Inventor: Timothy Halloran, Cupertino, Calif.

[73] Assignee: Loral Aerospace Corp., New York, N.Y.

[21] Appl. No.: 275,604

[22] Filed: Jul. 15, 1994

[51] Int. Cl.⁶ .................................................... H04L 27/36
[52] U.S. Cl. .................... 332/103; 332/105; 325/261; 325/284; 325/296; 325/308
[58] Field of Search ................................ 332/103, 104, 332/105; 375/39, 42, 52, 53, 67

[56] References Cited

U.S. PATENT DOCUMENTS

| | | | |
|---|---|---|---|
| 4,168,397 | 9/1979 | Bradley | 332/104 |
| 4,464,767 | 8/1984 | Bremer | 375/67 |
| 4,571,549 | 2/1986 | Lods et al. | 332/103 |
| 5,237,292 | 8/1993 | Chethik | 332/103 |

*Primary Examiner*—Siegfried H. Grimm
*Attorney, Agent, or Firm*—Kenneth W. Float; Anthony W. Karambe

[57] ABSTRACT

A vector modulator that sums outputs of a plurality of quadrature-phase-shift-key (QPSK) modulator elements, each controlled by two digital input signals and a single local oscillator. The local oscillator provides a periodic sinusoidal output signal, and the modulator elements process the periodic sinusoidal output signal and the digital input signals. The state of the respective digital input signals determines which of four phase states are present at the output of the QPSK modulator. A plurality of summing devices are coupled to outputs of the modulator elements, and one summing device provides an analog constellation output signal of the vector modulator. A plurality of attenuators are provided for amplitude weighting output signals from the plurality of modulator elements. The outputs of the modulator elements are summed under control of their two respective digital input signals and the local oscillator to convert the digital input signals into phase and amplitude shifted, periodic, analog signals comprising the analog constellation output signal. In a second embodiment, a power divider is coupled between the local oscillator and the plurality of modulator elements and a power combiner is used to combine the summed output signals derived from the modulator elements. The modulator elements may each be a GaAs microwave monolithic integrated circuit that includes a 90° coupler followed by first and second input amplifiers for respectively receiving and amplifying the periodic sinusoidal signal derived from the local oscillator, and first and second data amplifiers for respectively receiving and amplifying I and Q data input signals to provide amplified I and Q data input signals. First and second mixers are respectively coupled to outputs of the respective input and data amplifiers for multiplying the amplified local oscillator signals with the I and Q data input signals. A summing device is coupled to respective outputs of the mixers for generating a modulated output signal of the modulator element.

5 Claims, 3 Drawing Sheets

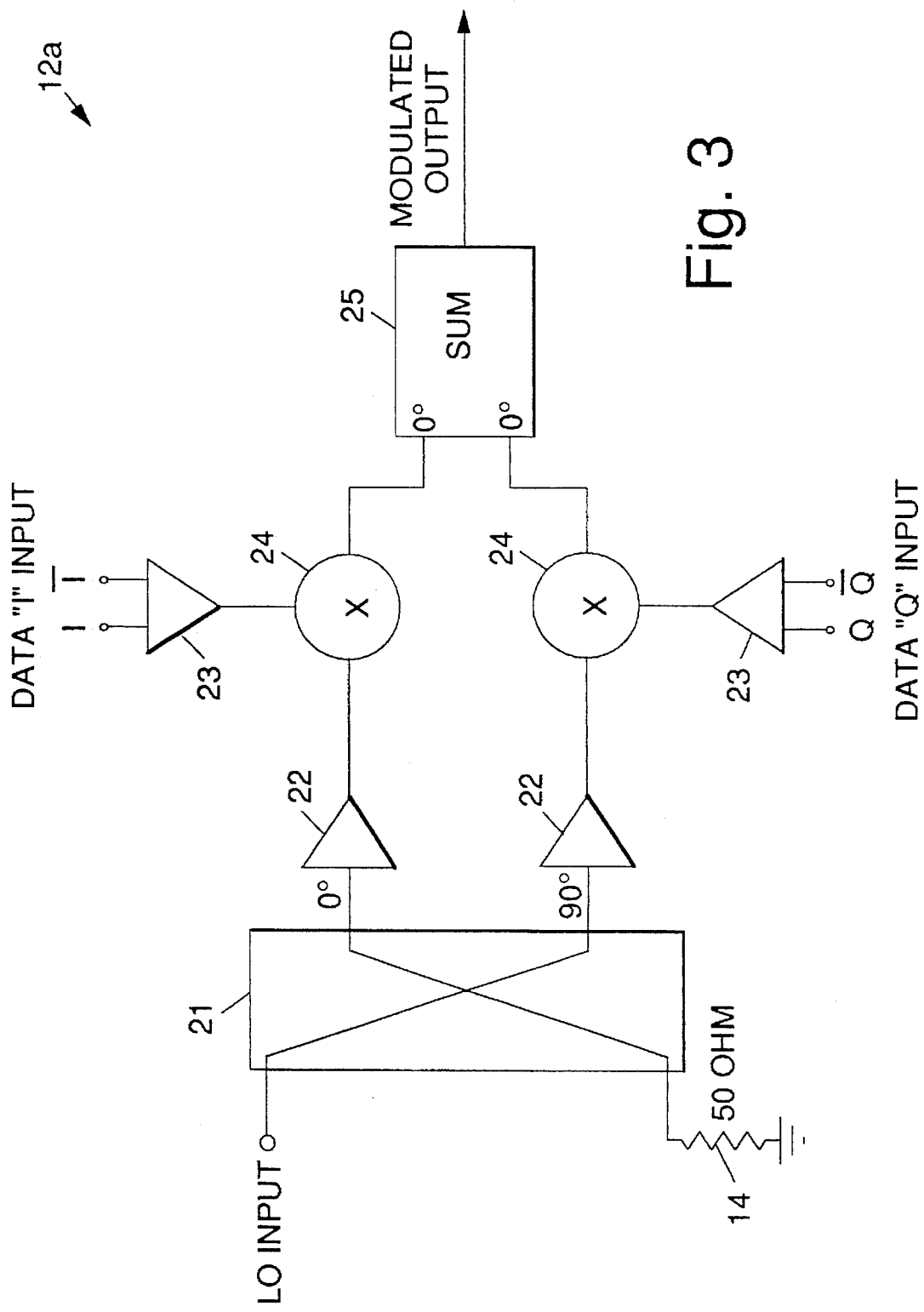

WIDEBAND VECTOR MODULATOR WHICH COMBINES OUTPUTS OF A PLURALITY OF QPSK MODULATORS

CROSS REFERENCE TO RELATED APPLICATIONS

Reference is made to U.S. Pat. No. 5,237,292 issued to Chethik, entitled "Quadrature Amplitude Modulation System with Compensation for Transmission System Characteristics", the contents of which are incorporated herein by reference.

BACKGROUND

The present invention relates to vector modulators, and more particularly, to wideband vector modulators that use gallium arsenide integrated circuits and that sum outputs of a plurality of quadrature-phase-shift-key (QPSK) modulator elements that are each controlled by two digital inputs and a single local oscillator.

U.S. Pat. No. 5,237,292 issued to Chethik and assigned to the assignee of the present invention discloses a quadrature amplitude modulation system where the present vector modulator may be employed. In the system described in the Chethik patent, digital signals are converted to phase and amplitude altered, periodic, analog signals and that are coupled to an output link. The system is adaptive and includes a plurality of simple quadrature phase shift keying modulators, each modulator having a plurality of controlling digital inputs, the state of which determines which of a plurality of phase displaced signals will be output. A local oscillator provides a periodic sinusoidal signal to each QPSK modulator. Summing circuits combine the outputs of the modulators to produce a constellation of phase and amplitude-displaced output sinusoidal signals. A processor/mapper combination enable conversion of a first set of digital inputs to a different set of digital outputs in accordance with a control input. Thus, the processor enables the alteration of the constellation of outputs in accordance with a control input, which may be indicative of the condition of a transmission facility.

The Chethik patent thus discloses a quadrature amplitude modulation system that employs quadrature-phase-shift-key vector modulators. However, the Chethik patent does not disclose or suggest the use of GaAs microwave monolithic integrated circuits to implement the quadrature-phase-shift-key modulators.

Other patent references generally disclose vector modulators, and include U.S. Pat. No. 4,168,397 issued to Bradley, U.S. Pat. No. 4,464,767 issued to Bremer, U.S. Pat. No. 4,571,549 issued to Lods et al., U.S. Pat. No. 4,930,141 issued to Ohmagari, U.S. Pat. No. 4,843,351 issued to Edwards et al., and U.S. Pat. No. 4,999,590 issued to Verdot.

It is therefore an objective of the present invention to provide for a quadrature amplitude modulation system that employs gallium-arsenide-based vector modulators. It is a further objective of the present invention to provide for wideband vector modulators that are implemented using gallium ,arsenide integrated circuits. It is yet another objective of the present invention to provide for a wideband gallium arsenide vector modulator wherein outputs of a plurality of quadrature-phase-shift-key modulator elements are each controlled by two digital inputs and a single local oscillator.

SUMMARY OF THE INVENTION

In order to meet the above and other objectives, the present invention comprises a wideband vector modulator implemented in gallium arsenide that sums a plurality of quadrature-phase-shift-key (QPSK) modulator elements, that are each controlled by two digital input signals and a single local oscillator. The QPSK modulator elements are each formed as GaAs microwave monolithic integrated circuits.

The wideband vector modulator comprises a local oscillator that provides a periodic sinusoidal output signal, and a plurality of quadrature-phase-shift-key (QPSK) modulator elements respectively coupled to the local oscillator for receiving the periodic sinusoidal output signal therefrom and respectively coupled to receive first and second controlling digital input signals applied thereto. The state of the respective digital input signals determines which of four phase states are present at the output of the QPSK modulator. A plurality of summing devices are coupled to outputs of selected modulator elements, and a selected summing device provides an analog constellation output signal of the vector modulator. A plurality of attenuators are coupled between the selected modulator elements and between an output of the selected modulator element and a selected summing device for amplitude weighting output signals from the plurality of modulator elements. The wideband vector modulator sums the outputs of the plurality of modulator elements under control of their two respective digital input signals and the local oscillator to convert the digital input signals into phase and amplitude shifted, periodic, analog signals comprising the analog constellation output signal of the vector modulator. In a second embodiment, a power divider is coupled between the local oscillator and the plurality of QPSK modulator elements and a power combiner is used to combine the summed output signals derived from the QPSK modulator elements. A plurality of scaled attenuators are coupled between the QPSK modulators and the power combiner for amplitude weighting the output signals from the plurality of modulator elements.

The QPSK modulator elements are each comprised of a GaAs microwave monolithic integrated circuit. The GaAs microwave monolithic integrated circuit comprises a 90° coupler followed by first and second input amplifiers for respectively receiving and amplifying the periodic sinusoidal signal derived from the local oscillator, and first and second data amplifiers for respectively receiving and amplifying I and Q data input signals to provide amplified I and Q data input signals. First and second mixers are respectively coupled to outputs of the first and second input amplifiers and the first and second data amplifiers for multiplying the amplified local oscillator signals with the I and Q data input signals. A summing device is coupled to respective outputs of the mixers for generating a modulated output signal of the modulator element.

In operation, digital signals are converted by the vector modulator to phase and amplitude shifted, periodic, analog signals and coupled to an output link. The wideband vector modulator includes a plurality of gallium arsenide microwave monolithic integrated circuit (GaAs MMIC) quadrature phase shift key (QPSK) modulators. A local oscillator provides a periodic sinusoidal input to each QPSK modulator. Each QPSK modulator has two controlling digital inputs, the state of which determines which of four phase states are present at the output of the QPSK modulator. The plurality of QPSK modulator outputs are then amplitude weighted and summed to form the output of the wideband vector modulator. This output contains a constellation of phase and amplitude displaced sinusoidal signals. There are two to the power of N ($2^N$) possible phase and amplitude combinations, where N is the number of digital control inputs (two digital control inputs per QPSK modulator).

The present invention is manufactured such that amplitude/phase vectors are generated directly at microwave frequencies with gigabit data rates. No up conversion signal processing is required. The carrier frequency is at microwave frequency. The input data rates are in the multi-gigabit range. Implementation of the wideband vector modulator uses GaAs MMIC's to provide for wide bandwidth and small size.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 shows details of a QPSK modulator that may be employed with the wideband vector modulators of FIGS. 1 and 2.

DETAILED DESCRIPTION

Figure 1:
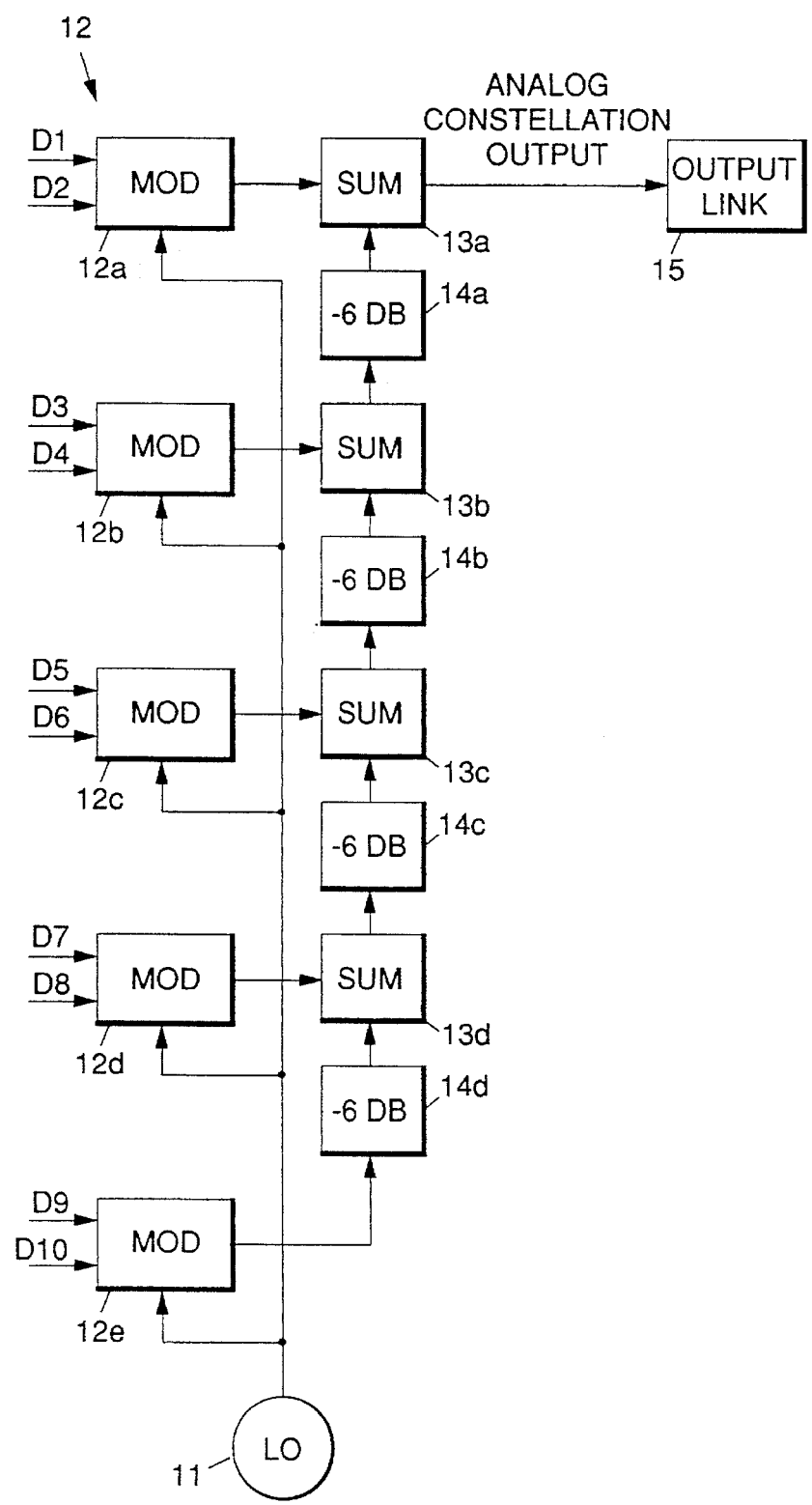
FIG. 1 is a block diagram of a first embodiment of a wideband vector modulator in accordance with the principles of the present invention.

Referring to the drawing figures, FIG. 1 is a block diagram of a first embodiment of a quadrature amplitude modulation system 10 employing a wideband vector modulator 12 in accordance with the principles of the present invention. The wideband vector modulator 12 is comprised of a local oscillator 11 that is coupled to a plurality of quadrature-phase-shift-key (QPS K) modulator elements 12a–12e. The local oscillator 11 provides a periodic sinusoidal input to each QPSK modulator element 12a–12e. Each of the plurality of quadrature-phase-shift-key (QPSK) modulator elements 12a–12e has two controlling digital input signals (D1, D2; D3, D4; D5, D6; D7, D8; D9, D10) applied thereto. It is to be understood that the number or modulator elements 12a–12e may be increased or decreased depending upon the requirements of a particular application.

The state of the digital input signals (D1, D2; D3, D4; D5, D6; D7, D8; D9, D10) determines which of four phase states are present at the output of the QPSK modulator 12. Outputs of the quadrature-phase-shift-key (QPSK) modulator element 12a–12d, excluding the last quadrature-phase-shift-key (QPSK) modulator element 12e are coupled to inputs of a respective plurality of summing devices 13a–13d. A plurality of attenuators 14a–14d (–6 dB, for example) are respectively coupled between each of the respective summing devices 13a–13d and between an output of the last modulator element 12e and the last summing device 13d. The output of the first summing device 13a provides an analog constellation output signal that is coupled to an output link 15.

The wideband vector modulator 12 is adapted to sum the outputs of the plurality of quadrature-phase-shift-key (QPSK) modulator elements 12a–12e, under control of their two respective digital inputs (D) and the single local oscillator 15. The QPSK modulator elements 12a–12e are comprised of a GaAs microwave monolithic integrated circuit, the details of which are shown and described with reference to FIG. 3 below.

In operation, the digital input signals (D1, D2; D3, D4; D5, D6; D7, D8; D9, D10) are convened by the wideband vector modulator 12 to phase and amplitude shifted, periodic, analog signals (the analog constellation output signal) and coupled to the output link 15. The wideband vector modulator 12 uses a plurality of gallium arsenide microwave monolithic integrated circuit (GaAs MMIC) devices as the quadrature phase shift key (QPSK) modulator elements 12a–12e. The local oscillator 11 provides a periodic sinusoidal input to each QPSK modulator elements 12a–12e. Each of the QPSK modulator elements 12a–12e has two controlling digital inputs (D1, D2; D3, D4; D5, D6; D7, D8; D9, D10), the state of which determines which of four phase states are present at the output of the QPSK modulator 12. The outputs of the plurality of QPSK modulator elements 12a–12e are then amplitude weighted by the attenuators 14a–14d and summed in the summing devices 13a–13d to form the analog output signal of the wideband vector modulator 12. This analog output signal contains a constellation of phase and amplitude displaced sinusoidal signals. There are two to the power of N ($2^N$) possible phase and amplitude combinations, where N is the number of digital control input signals (D1, D2; D3, D4; D5, D6; D7, D8; D9, D10), wherein two digital control inputs are used per QPSK modulator element 12a–12e.

Figure 2:
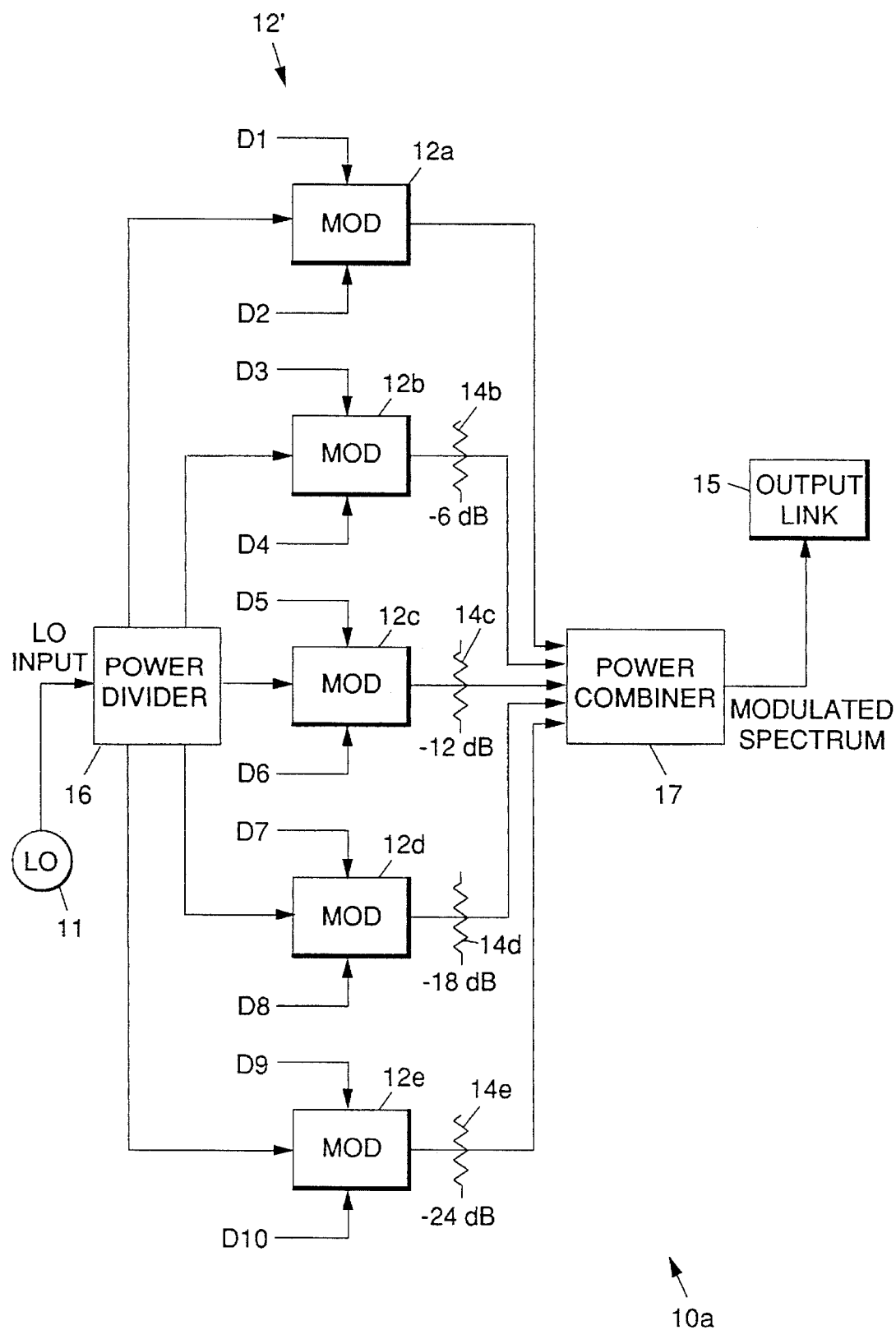
FIG. 2 is a block diagram of a second embodiment of a wideband vector modulator in accordance with the principles of the present invention.

FIG. 2 is a block diagram of a second embodiment of a quadrature amplitude modulation system 10a employing a wideband vector modulator 12' in accordance with the principles of the present invention. In this second embodiment, the wideband vector modulator 12' is comprised of a power divider 16 whose input is coupled to the local oscillator 11. A plurality of outputs of the power divider 16 are individually coupled to respective QPSK modulator elements 12a–12e. One of the QPSK modulator elements 12a is directly coupled to a power combiner 17 while the remaining QPSK modulator element 12b–12e are coupled through attenuators 14b–14e to the power combiner 17. The power combiner combines the respective signals derived from the plurality of QPSK modulator elements 12a–12e to provide a modulated spectrum output signal. In essence, the power combiner 17 replaces the plurality of summing devices 13a–13d in the first embodiment of the wideband vector modulator 12. The output of the power combiner 17 is the modulated spectrum output signal that comprises the analog constellation output signal that is coupled to the output link 17.

FIG. 3 shows details of a typical QPSK modulator element 12a that may be employed with the wideband vector modulators 12, 12' of FIGS. 1 and 2. The QPSK modulator elements 12a–12e are each comprised of a GaAs microwave monolithic integrated circuit, as is shown in FIG. 3. The QPSK modulator element 12a is comprised of a 90° coupler 21 followed by first and second input amplifiers 22 that receive and amplify the periodic sinusoidal signal derived from the local oscillator 11. Outputs of each of the amplifiers 22 are coupled to first inputs of respective mixers 24. I and Q data input signals are amplified by respective second amplifiers 23 and applied to second inputs of the respective mixers 24. The mixers 24 multiply the amplified local oscillator signals with the I and Q data input signals. Respective outputs of the mixers 24 are applied to a summing device 25 which provides a modulated output signal for the modulator element 12a.

Thus there has been described new and improved wideband vector modulators that use gallium arsenide integrated circuits, and that sum outputs of a plurality of quadrature-phase-shift-key modulator elements that are each controlled by two digital inputs and a single local oscillator. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A wideband vector modulator comprising:

a local oscillator that provides a periodic sinusoidal output signal;

a plurality of quadrature-phase-shift-key (QPSK) modulator elements that each comprises a GaAs microwave monolithic integrated circuit respectively coupled to the local oscillator for receiving the periodic sinusoidal output signal therefrom and respectively coupled to receive first and second controlling digital input signals (D) applied thereto, and wherein the state of the respective digital input signals (D) determines which of four phase states are present at the output of each QPSK modulator element;

a plurality of summing devices coupled to outputs of selected modulator elements, and wherein a selected summing device provides an analog constellation output signal of the vector modulator; and a plurality of attenuators coupled between the selected summing devices and between an output of a selected modulator element and a selected summing device for amplitude weighting output signals from the plurality of QPSK modulator elements;

wherein the wideband vector modulator sums the outputs of the plurality of quadrature-phase-shift-key (QPSK) modulator elements under control of their two respective digital input signals (D) and the local oscillator to convert the digital input signals (D) into phase and amplitude shifted, periodic, analog signals comprising the analog constellation output signal of the vector modulator.

2. The wideband vector modulator of claim 1 wherein each QPSK modulator element comprises a GaAs microwave monolithic integrated circuit comprising:

a 90° coupler coupled to the local oscillator;

first and second input amplifiers coupled to outputs of the 90° coupler for respectively receiving and amplifying the periodic sinusoidal signal derived from the local oscillator;

first and second data amplifiers for respectively receiving and amplifying I and Q data input signals to provide amplified I and Q data input signals;

first and second mixers respectively coupled to outputs of the first and second input amplifiers and the first and second data amplifiers for multiplying the amplified local oscillator signals with the I and Q data input signals; and a summing device coupled to respective outputs of the mixers for generating a modulated output signal of the modulator element.

3. A wideband vector modulator comprising:

a local oscillator that provides a periodic sinusoidal output signal;

a power divider having an input coupled to the local oscillator and a plurality of outputs;

a plurality of quadrature-phase-shift-key (QPSK) modulator elements respectively coupled to the plurality of outputs of the power divider for receiving the periodic sinusoidal output signal derived from the local oscillator, and for respectively receiving first and second controlling digital input signals (D) applied thereto, and wherein the state of the respective digital input signals (D) determines which of four phase states are present at the output of each QPSK modulator element;

a plurality of attenuators coupled to the outputs of selected QPSK modulator elements for amplitude weighting output signals from the plurality of QPSK modulator elements; and a power combiner coupled to outputs or amplitude weighted outputs of the QPSK modulator elements, for combining the respective output signals derived therefrom, and which provides a modulated spectrum output signal of the vector modulator; and wherein the wideband vector modulator sums the outputs of the plurality of quadrature-phase-shift-key (QPSK) modulator elements under control of their two respective digital inputs (D) and the local oscillator to convert the digital input signals (D) into phase and amplitude shifted, periodic, analog signals comprising the modulated spectrum output signal of the vector modulator.

4. The wideband vector modulator of claim 3 wherein the QPSK modulator elements are each comprised of a GaAs microwave monolithic integrated circuit.

5. The wideband vector modulator of claim 3 wherein each QPSK modulator element comprises a GaAs microwave monolithic integrated circuit comprising:

a 90° coupler coupled to the local oscillator;

first and second input amplifiers coupled to outputs of the 90° coupler for respectively receiving and amplifying the periodic sinusoidal signal derived from the local oscillator;

first and second data amplifiers for respectively receiving and amplifying I and Q data input signals to provide amplified I and Q data input signals;

first and second mixers respectively coupled to outputs of the first and second input amplifiers and the first and second data amplifiers for multiplying the amplified local oscillator signals with the I and Q data input signals; and a summing device coupled to respective outputs of the mixers for generating a modulated output signal of the modulator element.

* * * * *